United States Patent [19]

Curtsinger et al.

[11] Patent Number: 5,758,561
[45] Date of Patent: Jun. 2, 1998

[54] CIRCULAR SAW BLADE AND METHOD

[75] Inventors: John R. Curtsinger, Shelbyville, Ky.; Nicholas E. Achterberg, Phoenix, Md.

[73] Assignee: Black & Decker Inc., Newark, Del.

[21] Appl. No.: 616,387

[22] Filed: Mar. 15, 1996

Related U.S. Application Data

[60] Provisional application No. 60/004,329, Sep. 26, 1995.
[51] Int. Cl.⁶ ........................... B23D 61/02; B27B 33/08
[52] U.S. Cl. ........................................ 83/835; 83/676
[58] Field of Search ............................ 83/835, 839, 837, 83/846, 847, 848, 849, 850, 851, 852, 853, 854, 855, 838, 836, 840, 841, 842, 843, 844, 845, 676; 125/15

[56] References Cited

U.S. PATENT DOCUMENTS

| 13,300 | 10/1855 | Williams et al. |
| 88,949 | 4/1869 | Emerson . |
| 191,198 | 5/1877 | Tilton . |
| 195,699 | 10/1877 | Burger ............................ 83/343 |
| 199,852 | 1/1878 | Milligan . |
| 212,813 | 4/1879 | Miller . |
| 213,439 | 3/1879 | Miller . |
| D. 266,001 | 8/1982 | Wertheimer . |
| D. 337,713 | 7/1993 | Johnston . |
| D. 341,304 | 11/1993 | Johnston . |
| D. 345,683 | 4/1994 | Johnston . |
| 411,189 | 9/1889 | Grey . |

(List continued on next page.)

FOREIGN PATENT DOCUMENTS

| 276507 | 7/1912 | Austria . |
| 720678 | 11/1965 | Canada ............................ 83/835 |
| 102626 | 2/1983 | European Pat. Off. . |
| 01 141 042 | 5/1985 | European Pat. Off. . |
| 243909 | 4/1987 | European Pat. Off. . |
| 239676 | 5/1989 | European Pat. Off. . |
| 369120 | 5/1990 | European Pat. Off. . |
| 0 376 676 | 7/1990 | European Pat. Off. . |
| 376676 | 7/1990 | European Pat. Off. . |
| 303770 | 7/1991 | European Pat. Off. . |
| 578625 | 1/1994 | European Pat. Off. . |
| 598389 | 5/1994 | European Pat. Off. . |
| 640422 | 3/1995 | European Pat. Off. . |
| 790329 | 11/1935 | France . |
| 1050987 | 2/1959 | Germany . |
| 2654625 | 6/1978 | Germany . |
| 2703825 | 8/1978 | Germany . |
| 3234499 | 3/1984 | Germany . |
| 3346603 | 7/1984 | Germany ............................ 83/835 |
| 3310247 | 10/1984 | Germany . |
| 33 17 406 A1 | 11/1984 | Germany . |
| 3346321 | 7/1985 | Germany . |
| 34 05 407 A1 | 8/1985 | Germany . |

(List continued on next page.)

OTHER PUBLICATIONS

Article Entitled Stammblätter mit Spannungsausgleich und Geräuschminderung für Diament–Trennscheiben (Jan., Mar.—1983).

*Primary Examiner*—Kenneth E. Peterson
*Attorney, Agent, or Firm*—Harness, Dickey & Pierce, P.L.C.

[57] ABSTRACT

A saw blade is stamped with a circumferential edge. At least one gullet and shoulder are formed in the circumferential edge. Likewise, a tooth pocket is formed in the circumferential edge. The tooth pocket is defined by a wall, generally radial to circle, on the shoulder, and a shelf substantially perpendicular to the wall. A tooth is secured, ordinarily by brazing, in the pocket such that a portion of the shelf extends beyond the front face of the tooth towards the gullet so that the tooth can be brazed along its entire lateral edge such that resultant forces in the tooth are transmitted to the body of the blade. After the tooth is positioned into the tooth pocket, the tooth, as well as a projection of the blade shoulder, are ground off so that the tooth and shoulder are flush with one another. Thus, the tooth longitudinal edge is in complete contact with the shoulder wall maximizing its strength.

8 Claims, 5 Drawing Sheets

U.S. PATENT DOCUMENTS

| | | |
|---|---|---|
| 635,509 | 10/1899 | Rowe et al. . |
| 788,236 | 4/1905 | Bartholomew . |
| 1,083,645 | 1/1914 | Wettstein . |
| 1,711,102 | 4/1929 | Sierra, Jr. . |
| 2,256,847 | 9/1941 | Osenberg . |
| 2,903,782 | 9/1959 | Cowley . |
| 3,176,455 | 4/1965 | Buchanan . |
| 3,700,016 | 10/1972 | Strobel . |
| 3,730,038 | 5/1973 | Farb ............ 83/835 |
| 3,872,763 | 3/1975 | Kayahara . |
| 3,878,747 | 4/1975 | Soderstrom . |
| 3,981,216 | 9/1976 | Lemmon . |
| 4,026,177 | 5/1977 | Lokey . |
| 4,067,311 | 1/1978 | Benetello ............ 125/15 |
| 4,106,382 | 8/1978 | Salje et al. . |
| 4,232,580 | 11/1980 | Stewart . |
| 4,240,315 | 12/1980 | Tuomaala . |
| 4,281,617 | 8/1981 | Fjelkner et al. . |
| 4,333,371 | 6/1982 | Matsuda . |
| 4,417,833 | 11/1983 | Wertheimer . |
| 4,445,413 | 5/1984 | Ohwada . |
| 4,570,517 | 2/1986 | Souza et al. . |
| 4,574,676 | 3/1986 | Jansen-Herfeld . |
| 4,584,920 | 4/1986 | Jansen-Herfeld . |
| 4,604,933 | 8/1986 | Lesher et al. . |
| 4,776,251 | 10/1988 | Carter, Jr. . |
| 4,794,835 | 1/1989 | Fujiyoshi . |
| 4,848,205 | 7/1989 | Suzuki et al. . |
| 5,012,792 | 5/1991 | Kawata et al. . |
| 5,054,354 | 10/1991 | Kubis ............ 83/835 |
| 5,078,035 | 1/1992 | Moller et al. . |
| 5,182,976 | 2/1993 | Wittkopp . |
| 5,191,819 | 3/1993 | Hoshi . |
| 5,351,596 | 10/1994 | Johnston . |
| 5,365,986 | 11/1994 | Hooser . |
| 5,524,518 | 6/1996 | Sundström . |
| 5,555,788 | 9/1996 | Gakhar et al. ............ 83/835 |

FOREIGN PATENT DOCUMENTS

| | | |
|---|---|---|
| 8324657 | 1/1986 | Germany . |
| 35 13 689 A1 | 10/1986 | Germany . |
| 8703531 | 8/1987 | Germany . |
| 8711983 | 12/1987 | Germany . |
| 3804400 | 8/1989 | Germany . |
| 3605624 | 9/1989 | Germany . |
| 8224874 | 7/1993 | Germany . |
| 4243480 | 6/1994 | Germany . |
| 1264716 | 10/1989 | Japan . |
| 2-292118 | 12/1990 | Japan . |
| 42410 | 1/1992 | Japan . |
| 443001 | 2/1992 | Japan . |
| 453701 | 12/1992 | Japan . |
| 194514 | 4/1937 | Switzerland . |
| 484988 | 11/1975 | U.S.S.R. . |
| 802020 | 2/1981 | U.S.S.R. . |
| 1146197 | 3/1985 | U.S.S.R. . |
| 616664 | 1/1949 | United Kingdom . |
| 2107641 | 5/1983 | United Kingdom . |
| 8501242 | 3/1985 | WIPO . |
| 8705556 | 9/1987 | WIPO . |
| 89967 | 10/1989 | WIPO . |
| 9308969 | 5/1993 | WIPO . |

CIRCULAR SAW BLADE AND METHOD

CROSS-REFERENCE TO RELATED APPLICATION

This application is based upon and claims priority to U.S. provisional patent application Ser. No. 60/004,329 filed Sep. 26, 1995, and entitled *Circular Saw Blade and Method*, the specification and drawings of which are herein expressly incorporated by reference.

The subject matter of the present invention is related to U.S. patent application Ser. Nos. 29/051,681 and 29/051,682 filed Mar. 15, 1996, entitled *Saw Blade with Vents* and *Vents for Circular Saw Blades*, respectively, both assigned to the assignee of the present invention and both specifications and drawings herein expressly incorporated by reference.

FIELD OF THE INVENTION

The invention relates to carbide-tipped circular saw blades, and a method for manufacturing them. The invention is particularly directed to maximizing the strength of the saw blade to enhance the blade's endurance. The result is a circular saw blade having longer usable life, in the demanding environment of the framing phase of housing construction, than the conventional carbide-tooth circular saw blade.

BACKGROUND OF THE INVENTION

Present construction techniques in the housing construction industry involve building single and multiple-family homes with single-piece wood components like 2×4's, 2×6's and 2×10-inch fur and sheet stock, 4×8 foot in plywood and oriented-strandboard lumber As opposed to pre-fabricated sections, all components are shipped to the homesite and assembled in a "stick-built" fashion using steel nails, screws and staples.

Crews who specialize in the specific phase of housing construction called "framing" do their work after the foundation is laid and before the house is roofed and sided. A typical 2500 square foot house can be framed in three days by a 5-person crew, working at a very fast pace. The typical activities done during the framing phase include working non-stop measuring and sawing wood, nailing wall sections, erecting the frames in place, and trimming at any time at several locations within the house. In addition to the fast work pace, the framing crews must use poor quality lumber and deal with nailing inaccuracies.

Field research reveals that about 90% of the sawing is done with a seven and one-quarter inch hand-held circular saw. The framer is not given the high-quality wood and wood materials that a cabinet or furniture-maker uses, nor is he or she concerned with doing the finished trim, where the cuts must be smooth and accurate. The framer has two major user-perceived needs. One, of course, is speed; the other is how long a given saw blade will last. The latter condition occurs when the framer notices that it takes more and more effort or bias to get the saw blade through the lumber. This is the signal for the framer to replace the blade (which is now perceived as no longer being "sharp") with a new one. To date, the old blades are not resharpened, because blades sold for this type of work are usually priced so low that it is not cost-effective for the construction company to resharpen the blades, or damage to the teeth is too severe.

It has been discovered that "edge wear" is neither the only, nor the primary condition that increases the likelihood that a given blade will feel like it has lost its "sharpness".

Two significant factors with equal or greater impact on blade life is "tooth loss" and "breakage". These phenomena occur when the teeth encounter foreign matter in the wood, or a particularly stressful cutting application and the cutting edge is severely broken, or the tooth is removed completely. Therefore, the unchipped edges of the carbide teeth may remain sharp (have little edge wear), but the user nevertheless perceives that the saw blade has lost its "sharpness".

Unfortunately, the framer will probably have to use low-cost framing materials, which include dirty and gummy wood, and wood with loose nails and loose staples. When a carbide tooth, which is necessarily made of material much harder and more brittle than the steel of the saw blade itself, encounters these foreign materials, it is likely to chip or be torn off. However, it has been discovered that the very changes which one would consider to reduce chipping will also cause the tip to lose edge sharpness. Accordingly, the problem that the present invention addresses is this: how to minimize the likelihood that tooth damage will cause a given blade to require an unacceptable user bias force, while nevertheless maximizing the probability that the same blade will track the edge sharpness of a conventional carbide tipped blade.

If a blade can exhibit a significant drop in tooth damage, it will last longer in this most demanding of home construction environments.

SUMMARY OF THE INVENTION

Accordingly, it is an object of the present invention to provide a circular saw blade having carbide or other relatively hard teeth (or coated with a hard surface) for use in cutting primarily construction materials which is particularly suited to the framing phase of the housing construction industry. A further object of the present invention is to provide such a saw blade which stays sharp longer in this environment, as perceived by the user. It is a particular object of the preferred embodiments of the invention to provide a circular saw blade with carbide teeth, or other hard teeth or teeth with hard coatings, whose structure minimizes the incidence of damage while at the same time maintaining an acceptable level of edge wear ("actual sharpness").

In accordance with one aspect of the invention, a saw blade comprises a body having a circumferential edge. At least one gullet and shoulder are formed or stamped into the circumferential edge. A tooth pocket is also formed or stamped into the circumferential edge between the gullet and shoulder. The tooth pocket is defined by a wall, on the shoulder, and a shelf substantially perpendicular to the wall. A tooth is secured in the tooth pocket such that a portion of the shelf extends beyond the tooth into and towards the gullet. The wall has a depth such that the tooth is fully backed by the wall and shoulder maximizing the strength of the tooth. The wall and shelf provide a maximum area to secure the tooth to the saw body. The gullet is shallow with a flat or linear base. A size ratio exists between a shoulder circumferential width and gullet circumferential width between adjacent gullets, the ratio is about 2:1.

In accordance with a second aspect of the invention, a method of manufacturing a saw blade comprises stamping a blank with an overall circular shape with a circumferential edge which includes at least one gullet, an adjacent tooth pocket and shoulder. A tooth is provided and is positioned into the tooth pocket abutting a wall of the shoulder. The tooth is secured, preferably by brazing, in the tooth pocket. The tooth, as well as the blank, are ground together to provide a sharpened tooth to form a saw blade. During stamping, a radiused projection is formed adjacent the tooth pocket on the shoulder which also forms part of the wall which the tooth abuts against and is secured because stamping operations cannot economically produce non-radiused corners. The projection is ground down during the grinding process to enable the entire back of the tooth to be in contact with the shoulder to maximize strength. Also during stamping, a shallow gullet is formed which has a relatively flat base surface. Further during stamping, an expansion slot may be formed continuous with the gullet. The expansion slot includes a neck and an elliptical or oval shaped body. Also during stamping, heat vents may be formed in the body of the blade.

Other objects, features and advantages of the present invention will become more fully apparent from the following detailed description of the preferred embodiment and the accompanying drawings.

BRIEF DESCRIPTION OF THE DRAWINGS

In the accompanying drawings, in which like reference characters in the same or different figures indicate like parts.

DETAILED DESCRIPTION OF THE PREFERRED EMBODIMENT

Figure 1:
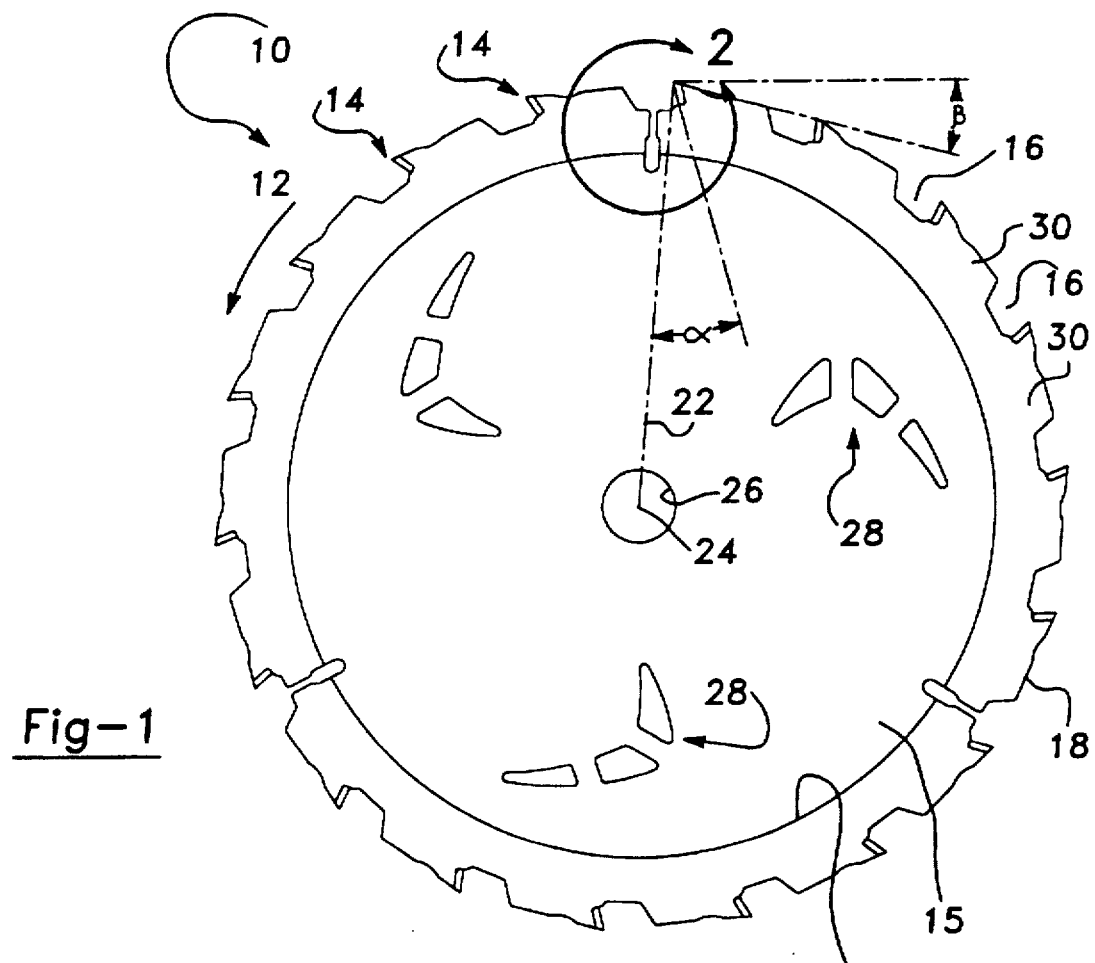
FIG. 1 is a side elevation view of a carbide-tipped circular saw blade in accordance with the present invention.

Turning to FIG. 1, a finished circular saw blade is illustrated and designated with the reference numeral 10, and rotates in the direction of cut 12. The saw blade is equipped with carbide teeth 14 which are ordinarily wider than the width of the saw blade body 15. The teeth 14 are mounted at the rear surfaces of the gullet 16 on the shoulder 30 formed in the outer perimeter or circumferential edge 18 of the saw blade, the term rear meaning with respect to the direction of the cut 12. The body 15 is formed out of a thin steel plate ordinarily by stamping.

The tip of the tooth 14 is shown engaging a radius 22 passing through the center 24 of the arbor hole 26 of the saw blade 10. A thin hard coating 29 may be applied about the outer circumferential portion of the saw blade to provide increased wear characteristics and to reduce drag.

The teeth 14 may be carbide or other hard material teeth which are commercially available. The teeth preferably are manufactured from a tungsten carbide grain/cobalt sintered matrix (herein "carbide").

The teeth 14 are ordinarily alternately beveled left and right to best suit the application. The tooth 14 is at a hook angle $\alpha$ of about 18 degrees. Also, a clearance angle $\beta$ is present at the top or back of the tooth along the shoulder 30 at about 11 degrees.

Figure 2:
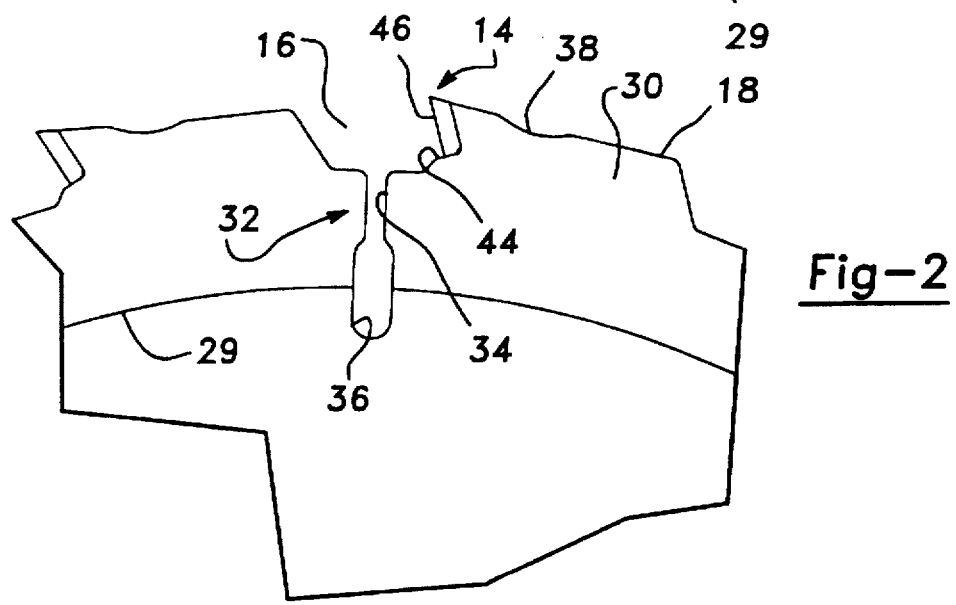
FIG. 2 is an enlarged view of a single tooth like that in FIG. 1 within circle 2.
Figure 3:
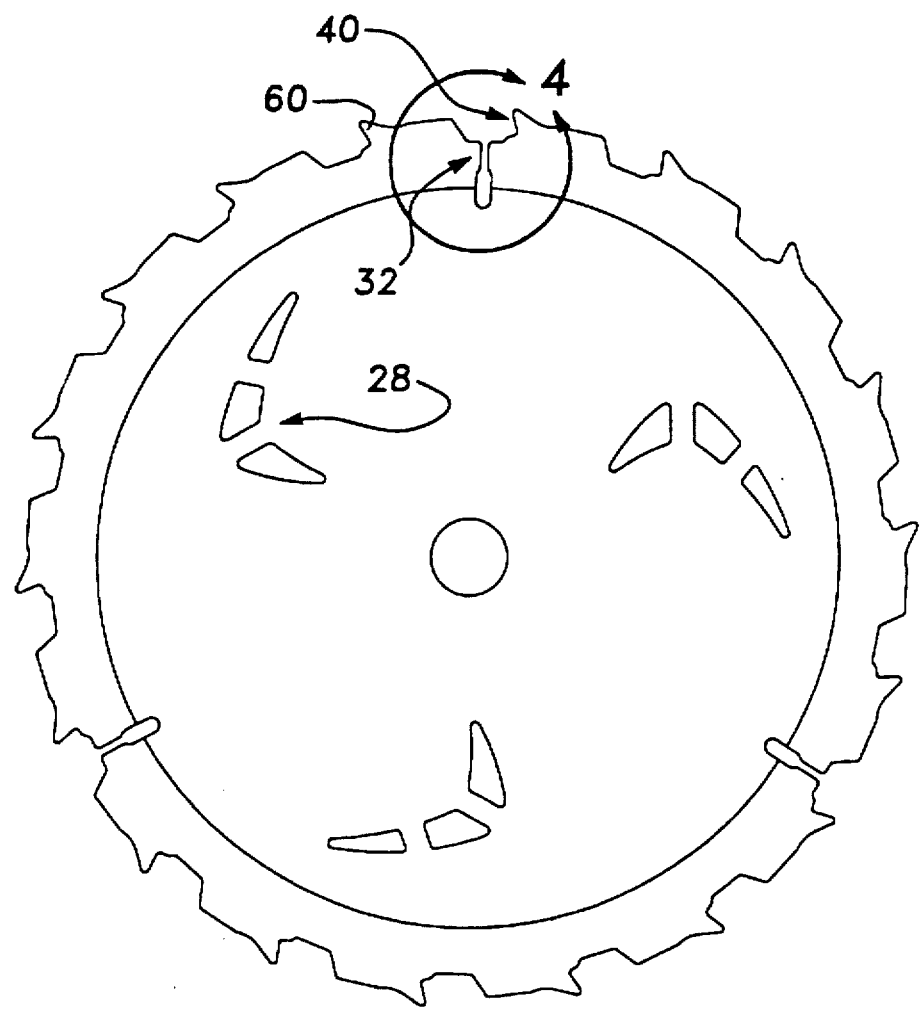
FIG. 3 is a side elevation view of a stamping of the body of the circular saw blade in accordance with the present invention.

Referring now to FIGS. 1 and 2, the peripheral or circumferential edge 18 includes at least one and ordinarily a plurality of alternating gullets 16 and shoulders 30. The gullets 16, which are the gaps between the shoulder and teeth, are ordinarily shallow and include a relatively flat or linear base 48 such that when viewed in side elevation the gullet provides a rectangular appearance with the periphery as one of the longitudinal sides. A ratio exists between the circumferential width of the shoulder 30 to the gullet 16 of about 2:1. Thus, the circumferential distance between adjacent gullets 16 is such that the gullet makes up about one-third, and the shoulder two-thirds, of the circumferential distance between adjacent teeth.

Also, the gullet 16 may include an expansion slot 32 which extends from and is continuous with the gullet 16. The expansion slot 32 includes a short neck 34 and an ellipsoidal or oval or round shaped body 36. The expansion slots 32 enable flexing of the blade, under high-heat cutting application. Also, the shallow gullets and shorter expansion slots add to the tip or tooth stability which, in turn, enables the blade to stay on line during cutting.

The shoulders 30 on the peripheral edge 18 are substantially linear except for a shallow arcuate recess 38. The recess 38 provides clearance for a grinding wheel when the shoulder and tooth are ground to form the sharpened blade as will be discussed herein.

Figure 4:
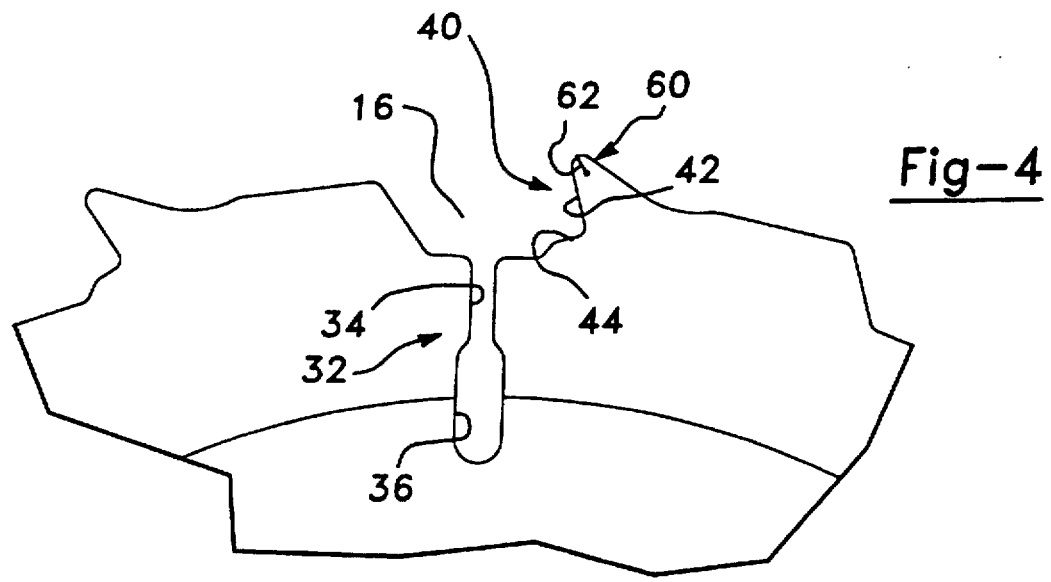
FIG. 4 is an enlarged elevation view of FIG. 3 within circle 4.
Figure 5:
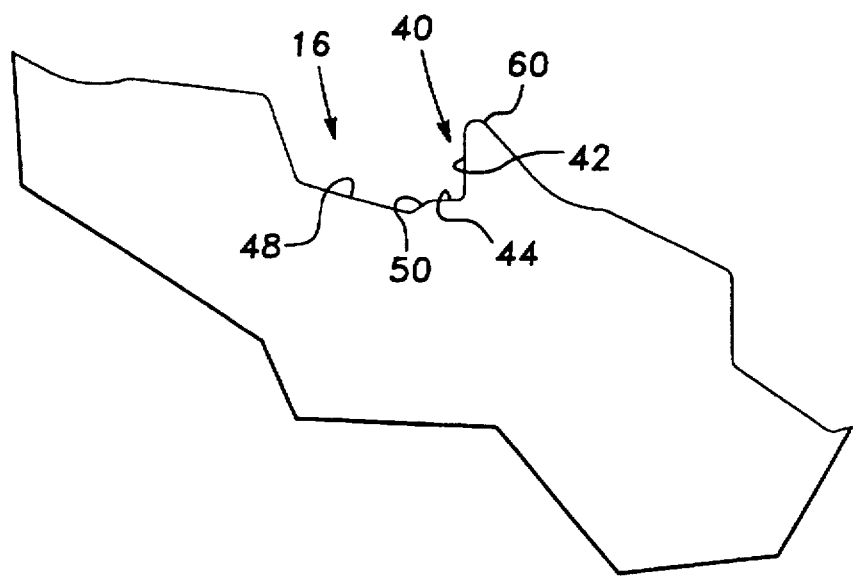
FIG. 5 is a view like FIG. 4.
Figure 8:
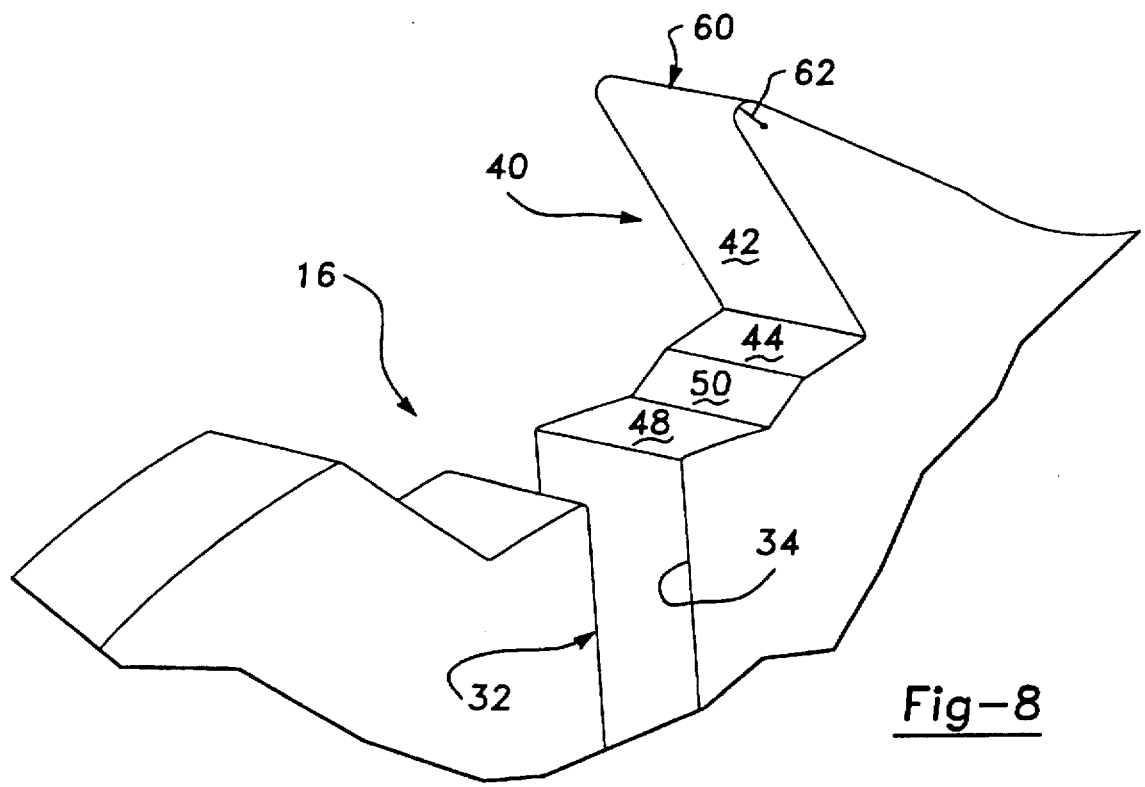
FIG. 8 is an enlarged perspective view of a gullet and tooth pocket.

A tooth pocket 40 adjacent the shoulder 30 includes a wall 42 and a shelf 44 substantially perpendicular to the wall, as best seen in FIGS. 4, 5 and 8. The wall 42 is continuous along the longitudinal edge of the tooth 14. Also, the shelf 44 is continuous with the lateral edge of the tooth 14 and extends beyond the front face 46 of the tooth 14. The wall 42 and the shelf 44 provide a large contact area which maximizes the strength of the tooth in the blade. The shelf 44 defines a plane, is angled with respect to the base 48 of the gullet 16, is above the base 48 of the gullet, and is connected with the gullet base 48 by a step 50. Thus, with the tooth supported and secured in the blade pocket fully on two of its edges, the tooth is better secured to the blade, than in conventional blades, as well as having additional strength since the entire shoulder is behind the tooth during cutting action. Finally, the gullet is large enough to collect chips and dust during normal cutting.

Figure 7:
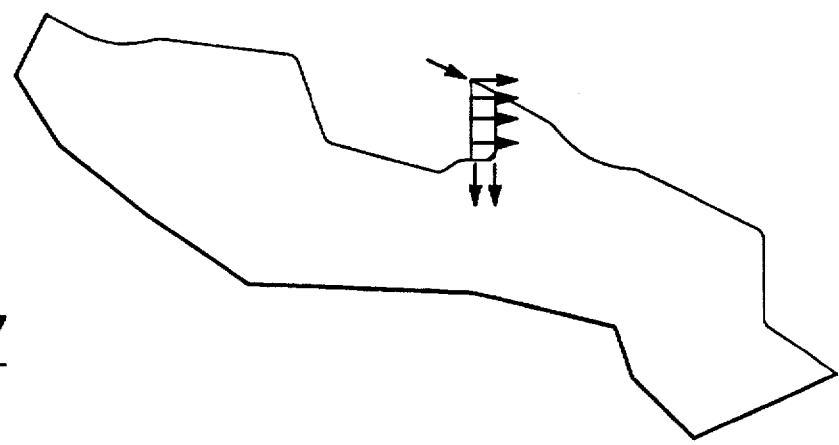
FIG. 7 is a view like FIG. 6 after grinding of the tooth and shoulder.
Figure 9:
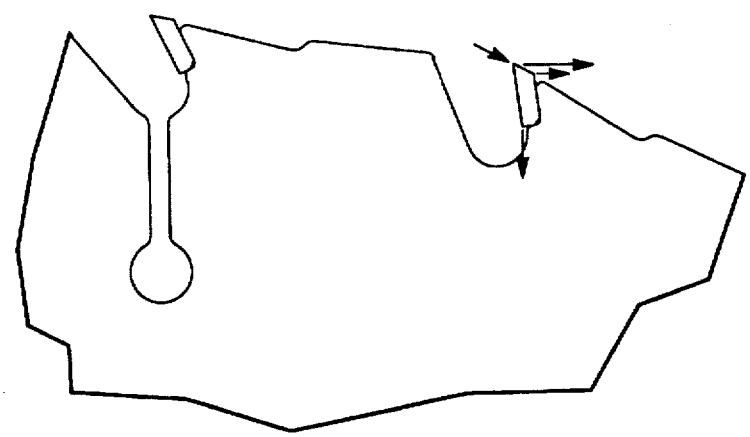
FIG. 9 is an elevation view of a prior art tooth.
Figure 10:
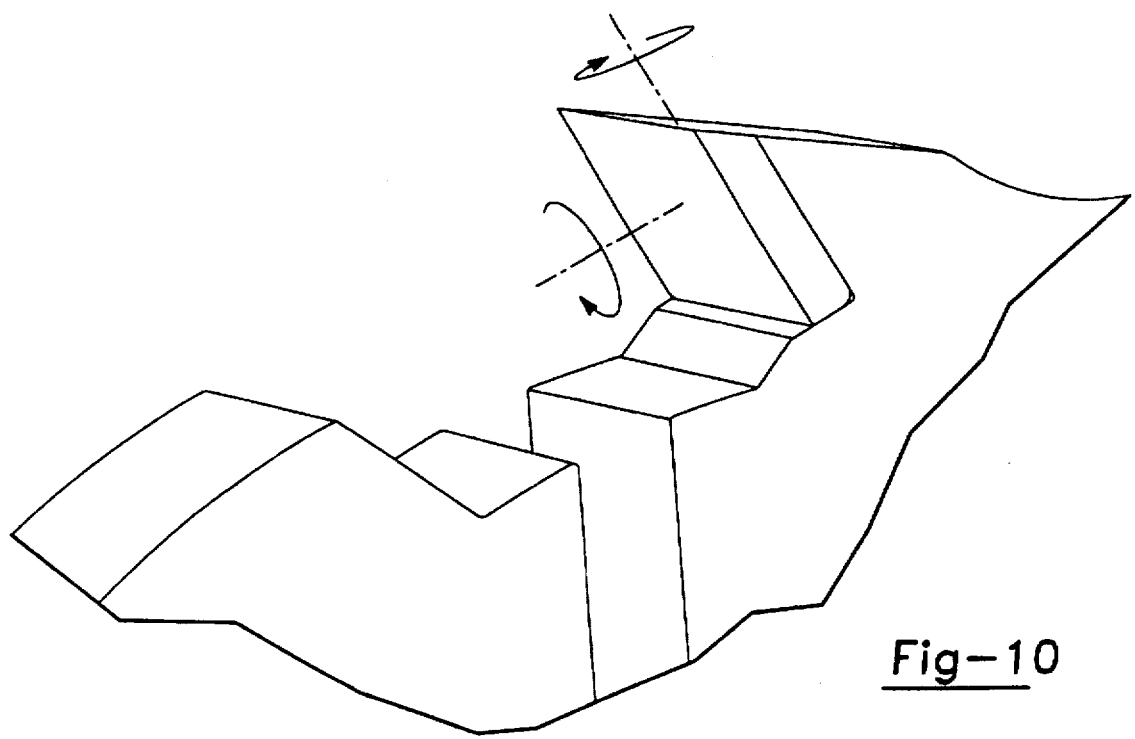
FIG. 10 is a view like FIG. 8 with a finished tooth

Turning to FIG. 7, the force acting on the tooth and the resultant force vectors are shown. As can be seen in FIG. 7, the force at the tip of the tooth is transmitted rearwardly to the shoulder 30, as well as radially downwardly towards the shelf. By having a portion of the shelf extend beyond the front of the tooth, a reactive force is applied by the body along the lateral edge 66. Also, at the corner of the lateral edge and longitudinal edge of the tooth, the shelf provides a resistive force reducing moments which may be present in the tooth. Thus, by having the entire area brazed, the tooth is provided with maximum strength. This is compared with FIG. 9, a prior art tooth, where the shelf does not extend beyond the tooth where a reactive force is not applied at the corner of the tooth, thus enabling a moment force to be created which tends to dislodge the tooth from the braze and the body. Also, larger moment forces are capable when the tooth is not flush with the shoulder. Furthermore, in a situation where poorly supported objects are hit (such as loose nails, knots, etc.), the present invention enables more resistance to twisting forces outside the plane of the blade as seen in FIG. 10. These twisting forces are known for removing the entire tooth. However, due to the securement of the tooth in the tooth pocket, the present invention resists the twisting force and reduces the likelihood of tooth removal.

Turning to FIGS. 3 through 8, a better understanding will be provided to manufacture the blade.

Manufacturing of the blade is accomplished by stamping a coil/steel raw material to form the blade plate or body 15. The stamping of the steel forms the gullets 16, shoulders 30, heat vents 28, expansion slots 32, and arbor hole 26. Also during stamping, a projection 60 is formed on the shoulders 30.

The projection 60 includes a radius 62 which has a desired size which enables the dies that stamp out the blades to eliminate sharp corners which will preserve die life.

Figure 6:
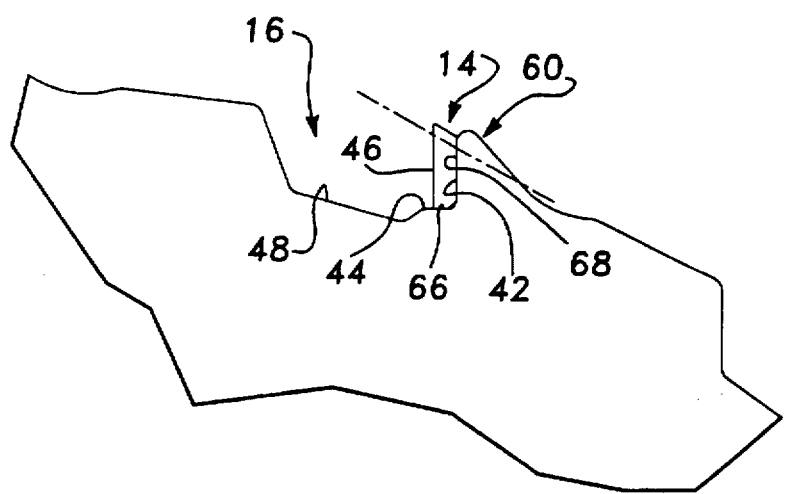
FIG. 6 is a view like FIG. 5 after the carbide tooth has been brazed to the body.

The projection 60 includes a portion of the wall 42. Also, the projection 60 provides the wall 42 with a height which is substantially equal to or greater than the height of the tooth 14 as seen in FIG. 6. This provides a very deep pocket when the tooth 14 is first positioned in the tooth pocket 40 adjacent the wall 42 and the projection 60. By providing the projection 60 with its deep pocket, this eliminates grinding of the pocket step as is conventional in the prior art, thus reducing manufacturing tooling and production cost as well as increasing the speed of production.

After the tooth 14 is positioned into the pocket 40, abutting wall 42 and resting on shelf 44, the tooth is brazed, soldered, or otherwise attached. As seen in FIG. 8, the wall 42 and shelf 44 provide a maximum contact area to secure the tooth 14 with the blade body 15. The tooth 14, after positioned against the wall 42 and shelf 44, is brazed such that the brazing or solder flows substantially about the rearmost lateral 66 and longitudinal edge 68 of the tooth 14. This provides a substantial amount of brazing material to securely affix the tooth to the contact area of the wall 42 and shelf 44 on the blade body 15.

A prior art method of maximizing wall-contact area was to grind the pocket square eliminating the need for the radius. However, this is not cost-effective.

Once the tooth 14 is brazed with the blade body 15, the tooth 14 and shoulder 30 are ground so that the projection 60 is removed to provide the substantially flat or linear shoulder 30 as seen in FIGS. 1, 2 and 7. Also, after stamping, the plate body 15 is cleaned as is done in a conventional process. Also during the brazing, the area around the pocket may be tempered.

While the above detailed description describes the preferred embodiment of the present invention, the invention is susceptible to modification, variation, and alteration without deviating from the scope and fair meaning of the subjoined claims.

We claim:

1. A saw blade comprising:

a body having a circumferential edge;

at least one gullet formed in said circumferential edge;

at least one shoulder formed in said circumferential edge adjacent said gullet;

a tooth pocket formed in said circumferential edge, said tooth pocket defining a wall and a shelf adjacent to said wall, said shelf defining a plane;

a tooth secured in said pocket such that when the saw blade is in use a portion of said shelf extends beyond said tooth into said gullet, said shelf portion being coplanar with said shelf, said shelf enables a lateral edge of the tooth to be secured with the body.

2. The saw blade according to claim 1, wherein said tooth and an area of the shoulder adjacent said tooth are flush with one another along the circumferential edge.

3. The saw blade according to claim 2, wherein a shallow arcuate recess is in said shoulder along the circumferential edge adjacent said area.

4. The saw blade according to claim 1 including a plurality of gullets, shoulders, tooth pockets, and teeth.

5. The saw blade according to claim 4, wherein between adjacent gullets, a circumferential size ratio exists between the shoulder circumferential width and gullet circumferential width of about 2:1.

6. The saw blade according to claim 1, wherein said gullet is generally a parallelogram with said shelf portion forming a notch in a corner of said parellelogram.

7. The saw blade according to claim 1, wherein an expansion slot is connected with said gullet, said expansion slot defining a neck and an ellipsoidal or oval shaped portion in said blade.

8. The saw blade according to claim 1, wherein said saw blade is designed as a wood cutting blade.

* * * * *